(12) United States Patent
Kim et al.

(10) Patent No.: US 7,609,162 B2
(45) Date of Patent: Oct. 27, 2009

(54) MOBILE RFID SERVICE PROVIDING APPARATUS AND METHOD THEREOF

(75) Inventors: Mal-Hee Kim, Daejon (KR); Yong-Joon Lee, Daejon (KR); Cheol-Sig Pyo, Daejon (KR); Jong-Suk Chae, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 216 days.

(21) Appl. No.: 11/489,642

(22) Filed: Jul. 17, 2006

(65) Prior Publication Data
US 2007/0080784 A1    Apr. 12, 2007

(30) Foreign Application Priority Data
Oct. 10, 2005  (KR) ............... 10-2005-0095078
Dec. 7, 2005   (KR) ............... 10-2005-0118961

(51) Int. Cl.
G08B 13/14    (2006.01)
(52) U.S. Cl. ............. 340/572.1; 340/10.1; 455/41.1
(58) Field of Classification Search ........ 340/572.1, 340/10.1, 505; 455/41.1, 41.2, 41.3, 552.1, 455/412.1, 414.2, 414.3, 456.3; 709/202, 709/203, 217
See application file for complete search history.

(56) References Cited

U.S. PATENT DOCUMENTS

| 6,856,800 | B1 | 2/2005 | Henry et al. |
| 7,274,909 | B2 * | 9/2007 | Perttila et al. ............. 455/41.2 |
| 7,352,999 | B2 * | 4/2008 | Miettinen ................ 455/41.2 |
| 2003/0033518 | A1 | 2/2003 | Faccin et al. |
| 2003/0090998 | A1 | 5/2003 | Lee et al. |
| 2003/0147537 | A1 | 8/2003 | Jing et al. |
| 2003/0169149 | A1 | 9/2003 | Ohki et al. |
| 2004/0073786 | A1 | 4/2004 | O'Neill et al. |

(Continued)

FOREIGN PATENT DOCUMENTS

JP    2004-282522    10/2004

(Continued)

OTHER PUBLICATIONS

"The design of AAA server for Wireless LAN with 802.1x," by YoungHwan Ham et al.; *ITC-CSCC 2002*, vol. 3, pp. 1944-1974, 2002.

(Continued)

*Primary Examiner*—Anh V La
(74) *Attorney, Agent, or Firm*—Blakely, Sokoloff, Taylor & Zafman LLP (57) ABSTRACT

Provided is a mobile Radio Frequency Identification (RFID) service providing apparatus and a method thereof. The apparatus, includes: a policy server for establishing a policy on level of quality of service (QoS) to be provided to each user, and a policy to be applied between nodes for security; an Authentication, Authorization and Accounting (AAA) server for performing network access authentication and authorization to each user, authorization for a mobile RFID service, security association establishment and distribution between constituent nodes based on information of the policy server; a mobile RFID agent for performing a diameter client role and a mobile RFID service agent role; and a service server for searching uniform resource locator (URL) of a server providing information related to an RFID code and providing detailed information and history information to the mobile RFID phone.

12 Claims, 3 Drawing Sheets

U.S. PATENT DOCUMENTS

| | | |
|---|---|---|
| 2004/0181663 A1 | 9/2004 | Pienimaki et al. |
| 2004/0268132 A1 | 12/2004 | Waris |
| 2005/0178830 A1 | 8/2005 | Rosenburg |
| 2005/0190734 A1 | 9/2005 | Khalil et al. |
| 2006/0246871 A1* | 11/2006 | Takeshita et al. ............ 455/408 |
| 2006/0282334 A1* | 12/2006 | Kao et al. ..................... 705/26 |

FOREIGN PATENT DOCUMENTS

| | | |
|---|---|---|
| KR | 1020050099742 A | 10/2005 |
| KR | 1020060011450 A | 2/2006 |

OTHER PUBLICATIONS

"Mobile IPv6 Session Key Distribution Method At Radius-based AAAv6 System," by HaeDong Lee, et al.; *ICEIC 2004*, vol. 2, pp. 581-584, Aug. 2004.

* cited by examiner

MOBILE RFID SERVICE PROVIDING APPARATUS AND METHOD THEREOF

FIELD OF THE INVENTION

The present invention relates to a mobile Radio Frequency Identification (RFID) service providing apparatus and a method thereof; and, more particularly, to a Mobile RFID service providing apparatus for a differentiated service based on a quality of service (QoS) level, which can provide a safe mobile RFID service by designing an extension technique of a diameter Authentication, Authorization and Accounting (AAA) protocol for the mobile RFID service, and a method thereof.

DESCRIPTION OF RELATED ART

A standard for a present mobile Radio Frequency Identification (RFID) technology is in the process of establishment through a notional mobile RFID forum, and a security model is not defined in detail.

The mobile RFID service is not generalized yet. Maintaining security is very important in the mobile RFID service. According to the mobile RFID service, it is possible to acquire detailed information and other related information on a product by attaching a tag to a distributed product and reading tag information with an RFID reader.

Since information integrated with privacy information of a user can be illegally extracted in a mobile RFID application related to a purchase or finance service, the security in the mobile RFID service is a prerequisite condition.

The mobile RFID technology is not considered in a current Authentication, Authorization and Accounting (AAA) protocol. The AAA protocol only provides authentication, authorization and accounting services based on network access.

Therefore, security association (SA) between nodes related to the mobile RFID service should be established and applied to provide a trustful and differentiated mobile RFID service. Also, a method for providing a differentiated authorization service based on a quality of service (QoS) level or a policy of an information providing server.

SUMMARY OF THE INVENTION

It is, therefore, an object of the present invention to provide a mobile Radio Frequency Identification (RFID) service providing apparatus, which can provide a differentiated service based on a quality of service (QoS) level and a safe mobile RFID service through security for communication between nodes and authorization for the mobile RFID service by establishing and applying security association between constituent nodes for mobile RFID service based on an Authentication, Authorization and Accounting (AAA) protocol, and a method thereof.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a mobile Radio Frequency Identification (RFID) service providing apparatus, including: a policy server for establishing a policy on level of quality of service (QoS) to be provided to each user using an RFID mobile phone, and a policy to be applied between nodes for security; an Authentication, Authorization and Accounting (AAA) server for performing network access authentication and authorization to each user through a diameter message, authorization for a mobile RFID service, security association establishment and distribution between constituent nodes based on information of the policy server; a mobile RFID agent for performing a diameter client role and a mobile RFID service agent role upon request of the mobile RFID phone mounting the RFID reader; and a service server for searching uniform resource locator (URL) of a server providing information related to an RFID code based on QoS level information of the mobile RFID phone user given by the mobile RFID agent and providing detailed information and history information on an object with an RFID tag to the mobile RFID phone.

In accordance with another aspect of the present invention, there is provided an RFID service providing method, including the steps of: a) establishing a policy on level of quality of service (QoS) to be provided to each user using an RFID mobile phone, and a policy to be applied between nodes for security; b) performing network access authentication and authorization in an Authentication, Authorization and Accounting (AAA) server upon authentication request of the mobile RFID phone mounting an RFID reader through a mobile RFID agent, including QOS level information in an authentication result when the authorization is successful, and transmitting the QoS level information to the mobile RFID agent; c) transmitting an RFID code acquired through the RFID reader with the QoS level information from the mobile agent to an object directory service (ODS) server; d) searching uniform resource locator (URL) of a server providing information related to the RFID code in the ODS server and transmitting the URL to the mobile RFID agent; e) establishing security association with the AAA server by the mobile RFID agent upon request of the user and transmitting the URL search result to the mobile RFID phone; and f) providing detailed information on an object with the RFID tag to the mobile RFID phone based on the QoS level information in an object information service (OIS) server having the URL upon request of information including the QoS level information.

The method further includes the step of: g) providing history information on the object with the RFID tag from an Object Traceability Service (OTS) server having the URL to the mobile RFID phone based on the QoS level information upon request of the information including the QoS level information.

The method further includes the step of: h) providing finance information on the object with the RFID tag from a finance server having the URL to the mobile RFID phone based on the QoS level information upon request of the information including the QoS level information.

As described above, the present invention extends the diameter AAA protocol to provide the authorization for making a differentiated service based on a quality of service (QoS) level for the mobile RFID service possible and the security for communication between nodes.

The RFID technology has been developed under international concern. However, feeling against the RFID technology is not negligible since the RFID technology threatens the security. In addition, the threat of the mobile RFID service is larger. Since the RFID reader has mobility, there is a possibility that the information can be extracted and misused anytime and anywhere.

The present invention provides a security channel to provide a safe service to the user in the above circumstance and the differentiated service based on the QoS level, thereby providing profitability to a mobile RFID service provider.

Accordingly, it is expected that the mobile RFID service provider can revitalize much faster and dynamic service. When the information related to each tag can be subdivided and provided in diverse forms, the technology for providing authorization based on the QoS level and the security channel will be very attractive to providers who intend to do business for providing the mobile RFID service.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
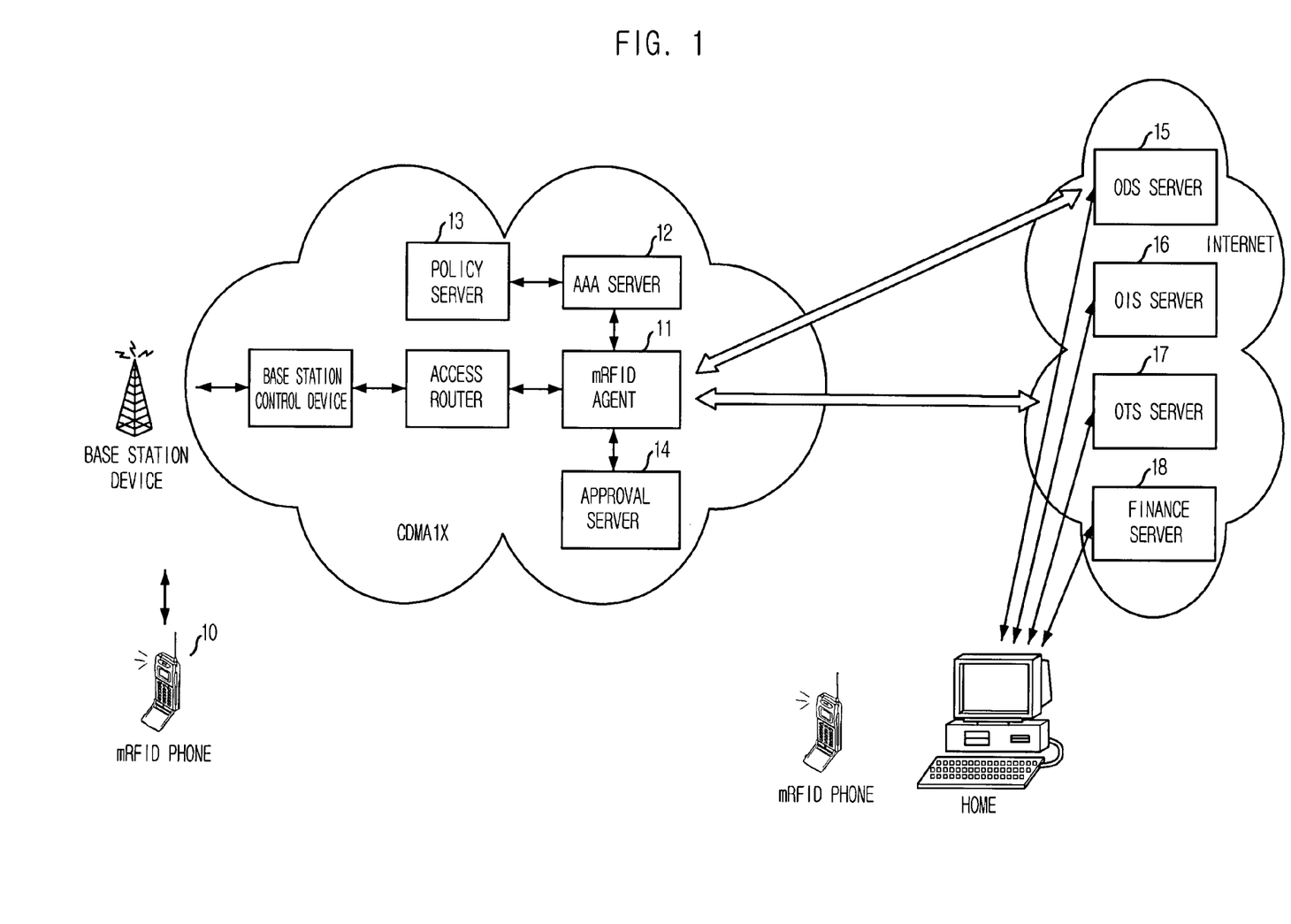
FIG. 1 is a diagram showing a mobile Radio Frequency Identification (RFID) service providing apparatus in accordance with an embodiment of the present invention.

FIG. 1 is a diagram showing a mobile Radio Frequency Identification (RFID) service providing apparatus in accordance with an embodiment of the present invention.

In FIG. 1, a reference number 10 is an mRFID phone, which is a mobile phone with an RFID reader; a reference number 11 is an mRFID agent, which is a mobile RFID agent for a mobile RFID service; a reference number 12 is an Authentication, Authorization and Accounting (AAA) server for network access authentication; a reference number 13 is a policy server; a reference number 15 is an object directory service (ODS) server for searching an address of a server having information of the product with the tag; a reference number 16 is an object information service (OIS) having production information; a reference number 17 is an Object Traceability Service (OTS) server for selectively managing history information; and a reference number 18 is a finance server.

As shown in FIG. 1, the mobile RFID service providing apparatus of the present invention includes the policy server 13, the AAA server 12, the mRFID agent 11, the ODS server 15, the OIS server 16 and the OTS server 17 and the finance server 18.

The policy server 13 establishes a policy on the level of quality of service (QoS) to be provided to each user using the mRFID phone 10, and a policy to be applied to between nodes for security.

The AAA server 12 performs network access authentication and authorization to each user through a diameter message based on the information of the policy server 13, authorization for the mobile RFID service, and a function establishing and distributing security association between constituent nodes.

The mRFID agent 11 performs a diameter client role and a mobile RFID service agent role upon request of the mRFID phone 10 with the RFID reader.

The ODS server 15, the OIS server 16, the OTS server 17 and the finance server 18 searches uniform resource locator (URL) of the server providing information related to the RFID code based on the QoS level information of the user of the mRFID phone 10 given by the mRFID agent 11, and provides detailed information and history information on the object with the RFID tag to the mRFID phone 10.

The RFID information acquired in the mRFID phone 10 is authenticated through Code Division Multiple Access (CDMA) 1× and transmitted to the ODS server 15, the OIS server 16, the OTS server 17 and the finance server 18. The authentication to the network access is performed based on application such as "Diameter Network Access Server Application", "Diameter Mobile IPv4 Application" or "Diameter Mobile IPv6 Application" according to network access patterns. Also, required authorization and accounting are performed.

Two application examples will be defined as follows for detailed explanation of the operation of the present invention.

(1) Jewelry Product Information Providing and Purchasing, History Inquiry Service A user using the mRFID phone intends to purchase a sapphire ring with the RFID tag in a shop. The mobile phone user makes the mobile phone close to the ring. The mobile phone acquires Unique Item Identifier (UII) from the RFID tag. The acquired UII is generated as an ODS query and transmitted to the ODS server. The ODS server transmits a Uniform Resource Locator (URL), which is an address of the application server providing detailed information on the ring, and other information to the mobile phone. The mobile phone accesses to the application server and provides detailed information on the ring such as a ring identifier, a degree of purity of the sapphire, a place of production of the sapphire, a ring producer, a price, a moving picture on the ring, etc.

The user checks the information, determines whether to purchase the product and performs a purchase process. The user purchases the product through a mobile approval service. When the approval is completed, the user returns home with the ring. The user arriving at home connects the mobile phone to Personal Computer (PC), directly accesses to an application server, a history providing server and a finance server based on the information stored in the mobile phone and inquires information on purchase, information on products and history information of the products.

(2) Electronic Finance Service

The user using the mRFID phone makes the mobile phone close to a bankbook or a credit card. The mRFID phone acquires the UII from the RFID tag. The acquired UII is generated as the ODS query and transmitted to the ODS server. The ODS server provides the URL of the finance server with the RFID tag. The user accesses to the finance server through the mobile phone and receives services such as account inquiry, bankbook printing and money transfer between accounts.

As described above, the present invention provides authorization, security association establishing and distributing function for the two types of application services.

The present invention assumes the type of the network access as an environment using Mobile IPv6. Since the mobile RFID service requires continuous reception of the contents, maintenance of a service session, and guarantee of the mobility, it is necessary to use a mobile Internet Protocol (IP) service. Therefore, the present invention uses "Diameter Mobile IPv6 Application" using an extensible authentication protocol (EAP) for the network access authentication.

The constituent nodes of the present invention are as follows.

1) The mRFID agent 11 is a node performing an agent role for the mobile RFID service and an AAA client role.

2) The AAA server 12 is a server providing functions of network access authentication and authorization for the user using the mRFID phone 10, authorization for the mobile RFID service, accounting, security association information generation and distribution.

3) The policy server 13 is a server establishing and managing a policy on the level of quality of service (QoS) will be provided to each user, and a policy to be applied between nodes for security. An AAA server 45 performs the authentication and the authorization on the user based on the information of the policy server 13. The policy server 13 and the AAA server 12 are logically divided or can be the same.

4) The ODS server 15 is a server searching URL of the server providing the information related to the RFID code.

5) The OIS server 16 is a server providing detailed information on the object with the RFID tag. The information can be based on text information or multimedia. The OIS server 16 provides information based on the QoS level.

6) The OTS server 17 is a server providing history information of the object with the RFID tag, and provides information based on the QoS level.

7) The finance server 18 and an approval server 14 can be a server of a specific bank connected to the mRFID phone or a bank whose bankbook or credit card with the tag is registered. The finance server 18 and the approval server 14 provide services such as approval of the user or bank transaction breakdown inquire by being connected to the RFID tag.

8) The mRFID phone 10 is a mobile phone with an RFID reader.

9) The object is a specific object with the tag. The object can be an object for purchase of the user, or a bankbook or a credit card with the tag.

The authorization of the present invention is performed as follows. Following setting-up operation is required for authorization of the mobile RFID service.

1. The QoS level is pre-determined. Level setup and allotment can be different according to each service and service provider.

2. The ODS server 15, the OIS server 16, the OTS server 17 and the finance server 18 are established to provide differentiated contents based on the QoS level. The policy is registered in the policy server 13. For example, only text-based information to a user of QoS level 0, text and image information to a user of QoS level 1, a moving picture to a user of QoS level 2, a related product and matching product information with moving picture information to a user of QoS level 3 are provided.

The authorization for the mobile RFID service is performed after authentication to the network access is successfully processed in the AAA server 12. The authentication of the AAA server 12 is performed between the mRFID phone and the AAA server, proper diameter application is used based on a network access pattern.

The network access authentication for the Mobile IPv6 service is used in the present invention. The AAA server 12 can access to the policy server 13 for authentication to the mobile phone user. The network access request by the mRFID phone 10 is generated as a diameter message by the mRFID agent 11 and transmitted to the AAA server 12. When the authentication to the mobile phone user is completed, the AAA server 12 transmits a result to the mRFID agent 11 and accesses to the ODS server 15 by the mRFID agent 11. Accordingly, the AAA server 12 acquires information of the information providing server required by the user and transmits the information to the mobile phone.

Figure 2:
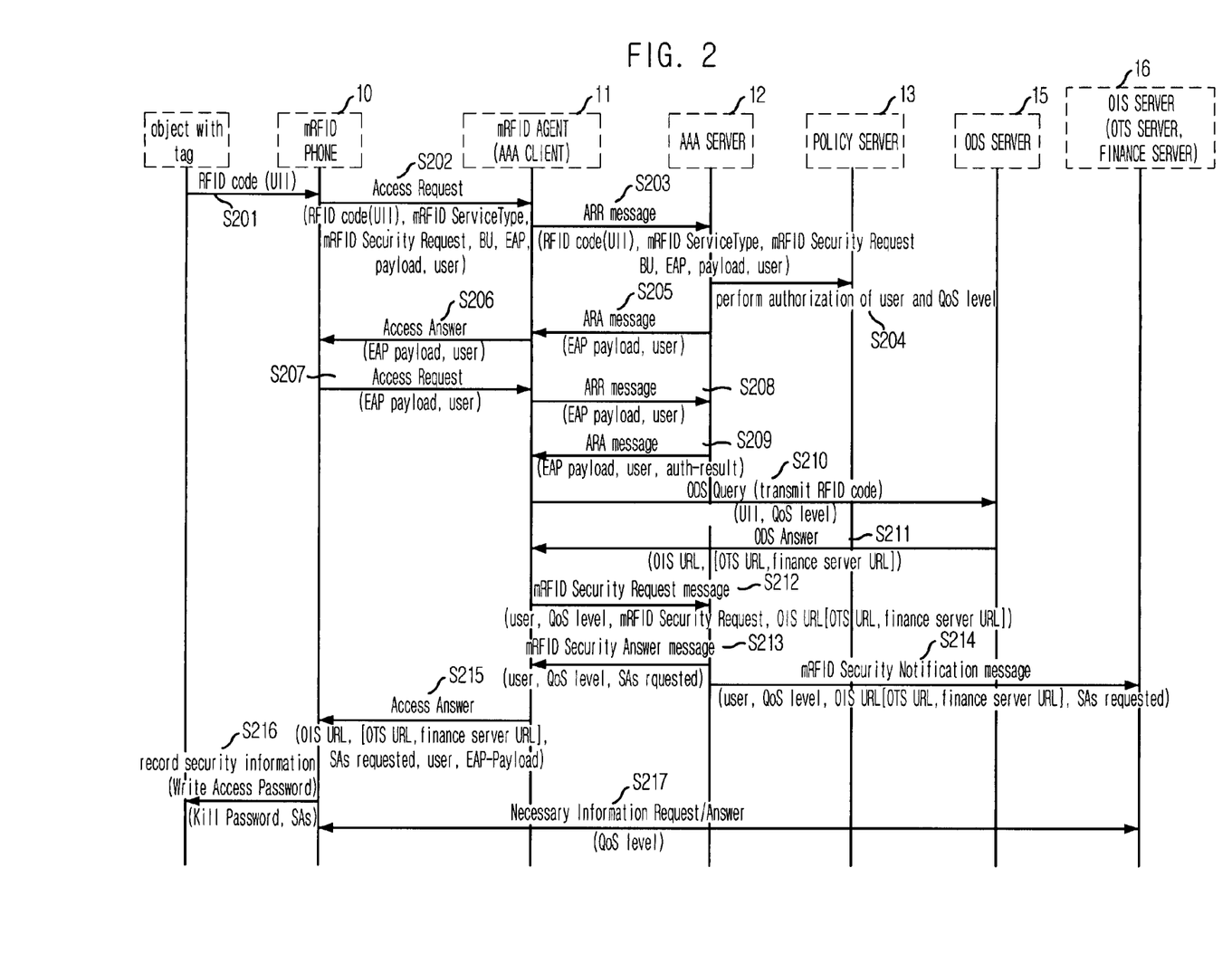
FIG. 2 is a diagram showing a processing flow between nodes through messages in a mobile RFID service providing method in accordance with an embodiment of the present invention.
Figure 3:
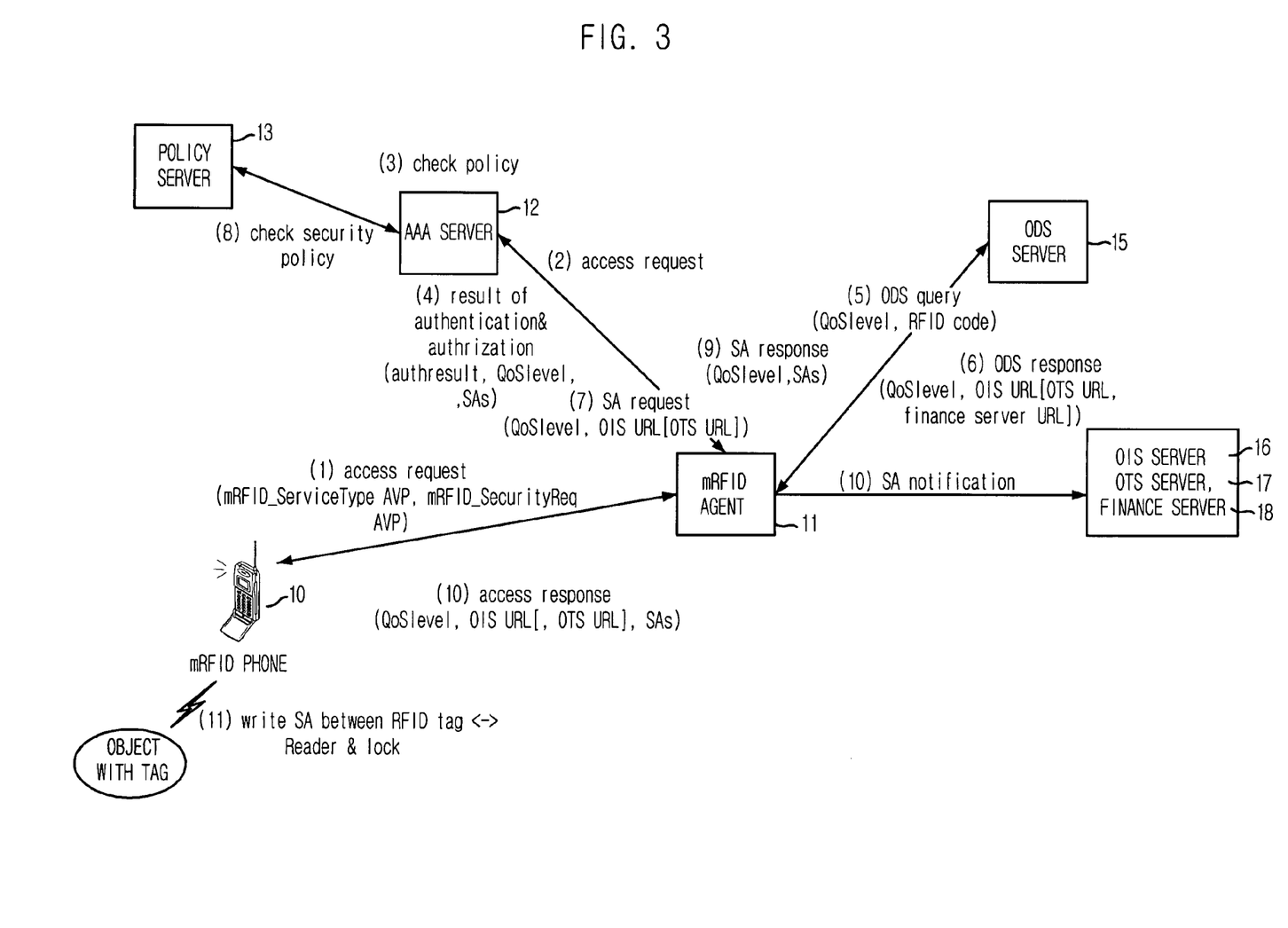
FIG. 3 is a diagram showing an information flow between nodes in the mobile RFID service providing method of the present invention.

FIG. 2 is a diagram showing a processing flow between nodes through messages in a mobile RFID service providing method in accordance with an embodiment of the present invention. FIG. 3 is a diagram showing an information flow between nodes in the mobile RFID service providing method of the present invention.

As shown in FIGS. 2 and 3, the present invention uses the Mobile Ipv6 application using the Extensible Authentication Protocol (EAP) as an authentication method.

In order to minimize traffic from the mRFID phone 10, the present invention includes RFID code information acquired by the RFID reader mounted on the mobile phone, an AA-SecurityAssociation-Request message from the mRFID phone 10, and mRFID ServiceType in an AA-Registration-Request (ARR) message. Subsequently, when the authentication is completed, the present invention acquires all information of the OIS server 16, the OTS server 17, the finance server 18 from the ODS server 15 by the mRFID agent 11, acquires all of related security association information, and has the acquired information transmitted to the mRFID phone 10 with an authentication result.

A processing Procedure between nodes will be defined in detail as follows based on the messages (see FIG. 2).

1) The RFID code information including UII is acquired based on the mRFID phone 10 at step S201, and network access control is performed whether Internet can be used based on the mobile communication network. The information from the application server is provided in a form of data packet and mobility should be provided due to a characteristic of the mRFID phone 10. Accordingly, the authentication is performed through "Diameter AAA application" for "Mobile IPv4" or "Mobile IPv6".

The "Diameter AAA Application" for the "Mobile IPv6" is used in the present invention. The mRFID phone 10 clearly describes a type of servers including the OIS server, the OTS server and the finance server, to which the user tries to access, in the access request. Also, following information is requested for security.

An access password and a kill password to be used between the RFID tag and the mobile phone, i.e., an RFID reader, are requested and encryption information is selectively requested.

The user authentication information and the encryption information to be used between the mobile phone and the mRFID service agent including the AAA Client are requested.

The user authentication information and the encryption information required when the user accesses to the application server through the PC/mobile phone are requested.

The user authentication information and the encryption information required when the user accesses to the OTS server through the PC/mobile phone are requested.

The user authentication information and the encryption information required when the user accesses to the finance server through the PC/mobile phone are requested.

Attribute Value Pair (AVP) is additionally defined to request the information, and the newly defined AVP is additionally included in the AA-Registration-Request (ARR), which is an authentication request message of "Diameter Mobile IPv6 Application".

mRFID_ServiceType AVP: one of OIS server, OTS server, and finance server and combination thereof can be used.
 OIS server
 OTS server
 finance server
 mRFID_SecurityReq AVP
  security policy request between the RFID tag and the reader: access password, kill password, encryption method request
  security policy request between the mobile phone, and the mRFID agent or AAA Client
  security policy request between the mobile phone and the OIS server
  security policy request between the mobile phone and the OTS server
  security policy request between the mobile phone and the finance server 2) The authentication request from the mRFID phone 10 is transmitted to the mRFID agent 11 such as Packet Data Serving Node (PDSN) at step S202. The mRFID agent 11 generates the information as a diameter message, i.e., the ARR message and transmits the diameter message to the AAA server at step S203.

3) The authentication is performed by the mRFID phone 10 and the AAA server 12 managed by the mobile communication network. Herein, the EAP is used for stability and flexibility of the authentication. In the EAP authentication, multi-roundtrip can be generated between the authentication node and the authentication server. When the EAP authentication is successfully processed, the AAA server 12 compares the QoS level transmitted from the policy server 13 with contents of mRFID_ServiceType AVP and mRFID_SecurityReq AVP requested by the user through the mobile phone. Subsequently, the authorization is performed at step S204. When the authorization is successful, the AAA server 12 transmits an authentication result to the mobile RFID agent 11 at step S205. Herein, an AA-Registration-Answer (ARA) message including the QoS level is used.

When the result of the transmitted authentication answer is successful, the mRFID agent 11 transmits the RFID code with the QoS level to the ODS server 15 at step S210.

The QoS level includes the followings.
QoS level:
whether the user is to use only the OIS server, or to use the OIS server with the OTS server,
which level of information is to be provided in the OIS server when the OIS server is used, e.g., to provide only text-based information, to provide multimedia information, to show only information which can be shown without a special security device, or to show all information when the security device is also provided,
to which level of the OTS server information is to be provided when the OTS server is used,
The level of diverse cases can be defined, just as the case of the OIS server.

4) The ODS server 15 searches URLs of the OTS server 17 and the finance server 18 based on the QoS level of the application server related with a product with the RFID code and transmits the URLs to the mRFID agent 11 at step S211. Herein, the RFID tag attached to a bankbook or a credit card, and URL of the finance server 18 connected to the mRFID phone 10 are included.

5) When there is a request of the user, the AA-SecurityAssociation-Request Message of URL between the tag and the reader, i.e., the mRFID phone, between the mRFID phone and the mRFID agent, between the mRFID phone and the acquired application server, between the mRFID phone and the OTS server, and between the mRFID phone and the finance server is transmitted from the mRFID agent 11 to the AAA server 12 at step S212. Herein, the diameter message including the AA-SecurityAssociation-Request message and the AA-SecurityAssociation-Answer message is additionally defined. Each message includes following information.

AA-SecurityAssocation-Request message: user, QoS level, OIS URL, OTS URL, finance server URL, mRFID Security-Request
 AA-SecurityAssocation-Answer message: user, QoS level, SAs requested 6) The AAA server 12 establishes information based on the requested security association information and the policy of each server and transmits the information to the mRFID agent 11 at step S213. Herein, the AA-SecurityAssociation-Answer message is used. The AAA server 12 transmits AA-SecurityAssociation-Notification Message to the OIS server 16 at step S214.

7) The mRFID agent 11 transmits Access Answer including answers from the ODS server 15 and the AAA server 12 to the mRFID phone 10 at step S215.

8) In the Access Answer, the mRFID phone 10 records security information between the RFID tag readers, which includes an access password, a kill password and encryption information in case of EPC C1G2, in the object with the tag and locks the security information at step S216. The password is recorded after necessarily encrypted. The security association information with other nodes is stored in the mRFID phone 10 and can be used when the mRFID phone 10 accesses to each node.

9) The mRFID phone 10 acquires detailed information of the product by accessing to the OIS server and shows the detailed information to the user at step S217. Herein, the QoS of the user is necessarily included. When the security is required, the information request message should be protected by the security policy generated by the AAA server 12.

10) The user selectively acquires history information of the product by accessing to the OTS server 17 and shows the history information to the user. Herein, the QoS of the user should be included. When the security is required, the information request message should be protected by the security policy generated by the AAA server 12.

11) The user selectively acquires finance information by accessing to the finance server 18 and shows the finance information to the user. Herein, the QoS of the user should be included. When the security is required, the information request message should be protected by the security policy generated by the AAA server 12.

12) When the user of the mRFID phone 10 tries to selectively acquire information by accessing to the OIS server 16, the OTS server 17 and the finance server 18 through the PC at home, the user accesses to the above servers based on SA information stored in the mRFID phone 10 and URL information of each server.

As described above, the present invention is based on the mobile RFID technology which will be established as a standard. An environment using the RFID tag and the RFID reader mounted in the mobile phone based on a 900 MHz frequency band is assumed. Also, an environment, in which network access authentication is performed based on an AAA server, is assumed.

The network access authentication is performed based on the AAA server, and authorization according to QoS of the user and a policy of the server is performed. Subsequently, a security policy between mobile RFID service nodes is dynamically generated and distributed. Sections, in which security association can be established, are between the RFID tag and the RFID reader, i.e., the mobile phone, between the RFID reader and the mRFID agent, i.e., Diameter AAA Client, between the mobile phone and the OTS server, between the mobile phone and the OIS server, and between the mobile phone and finance/approval server.

Therefore, the present invention provides security for communication between nodes by establishing and applying security association between constituent nodes for the mobile RFID service based on the diameter AAA protocol. Also, the present invention can provide a differentiated service based on QoS of the user and a policy of a service provider by providing authorization for the mobile RFID service.

The service provider can provide differentiated services based on the QoS level through authorization and safely protect the user from security threat such as a Big Brother problem. Accordingly, the present invention can revitalize the mobile RFID service.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application Nos. 2005-0095078 and 2005-0118961 filed with the Korean Intellectual Property Office on Oct. 10, 2005, and Dec. 7, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A mobile Radio Frequency Identification (RFID) service providing apparatus, comprising: a policy server for establishing a policy on level of quality of service (QoS) to be provided to each user using an RFID mobile phone, and a policy to be applied between nodes for security; an Authentication, Authorization and Accounting (AAA) server for performing network access authentication and authorization to each user through a diameter message, authorization for a mobile RFID service, security association establishment and distribution between constituent nodes based on information of the policy server; a mobile RFID agent for performing a diameter client role and a mobile RFID service agent role upon request of the mobile RFID phone mounting the RFID reader; and a service server for searching uniform resource locator (URL) of a server providing information related to an RFID code based on QoS level information of the mobile RFID phone user given by the mobile RFID agent and providing detailed information and history information on an object with an RFID tag to the mobile RFID phone.

2. The apparatus as recited in claim 1, wherein the QoS level is assessed in the policy server and nodes provide a differentiated service by applying the assessed QoS level to communication between nodes.

3. The apparatus as recited in claim 1, wherein the QoS level is pre-determined to perform authorization for the mobile RFID service, and a method of level setup and assignment is different according to each service and service provider, and the service server is established to provide differentiated contents based on each QoS level, and the policy is registered in the policy server.

4. The apparatus as recited in claim 3, wherein the authorization for the mobile RFID service is performed after the authentication to network access of a mobile Ipv6 environment in the AAA server is successfully performed, and the AAA server transmits a completion result of the authentication for the user to the mobile RFID agent, accesses to the service server by the mobile RFID agent and acquires information required by the user.

5. The apparatus as recited in claim 3, wherein in the authorization and the security association establishment for the mobile RFID service, the mobile RFID agent performs authentication through the AAA server by transmitting the RFID information acquired from the mobile RFID phone with a network access request, instantly accesses to an object directory service (ODS) server of the service server when the authentication is successfully completed, acquires information of a service providing node requested by the mobile RFID phone, which includes an object information service (OIS) server, an Object Traceability Service (OTS) server and a finance server of the service server, requests the AAA server to establish security association with the acquired node when the user requests, and transmits an authentication result to the mobile RFID phone.

6. The apparatus as recited in claim 5, wherein the mobile RFID phone store security association information transmitted in the process of the authentication, and can access to the OIS server, the OTS server and the finance server through a Personal Computer (PC) based on the stored information.

7. The apparatus as recited in claim 1, wherein the diameter message defines functions of mRFID_UserQoSLevel AVP (Attribute Value Pair), mRFID_ServiceType AVP, mRFID_SecurityReq AVP and mRFID_SA (Security Association) AVP, and includes AA-SecurityAssociation-Request message and AA-SecurityAssociation-Answer message.

8. A mobile Radio Frequency Identification (RFID) service providing method, comprising the steps of: a) establishing a policy on level of quality of service (QoS) to be provided to each user using an RFID mobile phone, and a policy to be applied between nodes for security; b) performing network access authentication and authorization in an Authentication, Authorization and Accounting (AAA) server upon authentication request of the mobile RFID phone mounting an RFID reader through a mobile RFID agent, including QoS level information in an authentication result when the authorization is successful, and transmitting the QoS level information to the mobile RFID agent; c) transmitting an RFID code acquired through the RFID reader with the QoS level information from the mobile agent to an object directory service (ODS) server; d) searching uniform resource locator (URL) of a server providing information related to the RFID code in the ODS server and transmitting the URL to the mobile RFID agent; e) establishing security association with the AAA server by the mobile RFID agent upon request of the user and transmitting the URL search result to the mobile RFID phone; and f) providing detailed information on an object with the RFID tag to the mobile RFID phone based on the QoS level information in an object information service (OIS) server having the URL upon request of information including the QoS level information.

9. The method as recited in claim 8, further comprising the step of: g) providing history information on the object with the RFID tag from an Object Traceability Service (OTS) server having the URL to the mobile RFID phone based on the QoS level information upon request of the information including the QoS level information.

10. The method as recited in claim 8, further comprising the step of: h) providing finance information on the object with the RFID tag from a finance server having the URL to the mobile RFID phone based on the QoS level information upon a request of the information including the QoS level information.

11. The method as recited in claim 8, wherein in the authorization and the security association establishment for the mobile RFID service, the mobile RFID agent performs authentication through the AAA server by transmitting the RFID information acquired from the mobile RFID phone with a network access request, instantly accesses to an object directory service (ODS) server of the service server when the authentication is successfully completed, acquires information of a service providing node requested by the mobile RFID phone, which includes an object information service (OIS) server, an Object Traceability Service (OTS) server and a finance server of the service server, requests the AAA server to establish security association with the acquired node when the user requests, and transmits an authentication result to the mobile RFID phone.

12. The method as recited in claim 11, wherein the mobile RFID phone can store security association information transmitted in the process of the authentication, and access to the OIS server, the OTS server and the finance server through Personal Computer (PC) based on the stored information.

* * * * *